United States Patent
Urata et al.

(10) Patent No.: US 9,841,900 B2
(45) Date of Patent: Dec. 12, 2017

(54) STORAGE CONTROL APPARATUS, METHOD, AND MEDIUM FOR SCHEDULING VOLUME RECOVERY

(71) Applicant: FUJITSU LIMITED, Kawasaki-shi, Kanagawa (JP)

(72) Inventors: Kazuhiro Urata, Kawasaki (JP); Kazuhiko Ikeuchi, Kawasaki (JP); Chikashi Maeda, Kawasaki (JP); Yukari Tsuchiyama, Kawasaki (JP); Takeshi Watanabe, Kawasaki (JP); Guangyu Zhou, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/807,068

(22) Filed: Jul. 23, 2015

(65) Prior Publication Data

US 2016/0062658 A1    Mar. 3, 2016

(30) Foreign Application Priority Data

Sep. 2, 2014   (JP) .................................. 2014-177842

(51) Int. Cl.
*G06F 3/06* (2006.01)
*G06F 11/00* (2006.01)

(52) U.S. Cl.
CPC .......... *G06F 3/0604* (2013.01); *G06F 3/0638* (2013.01); *G06F 3/0689* (2013.01); *G06F 11/00* (2013.01)

(58) Field of Classification Search
CPC .. G06F 11/1008; G06F 11/1092; G06F 3/061; G06F 3/0614

USPC .................... 714/6.1, 6.2; 711/114
See application file for complete search history.

(56) References Cited

U.S. PATENT DOCUMENTS

2004/0078628 A1* 4/2004 Akamatu ............... G06F 9/4881
                                                    714/6.1
2004/0230742 A1   11/2004 Ikeuchi et al.
2006/0242371 A1* 10/2006 Shono ................. G06F 11/1471
                                                    711/162

(Continued)

FOREIGN PATENT DOCUMENTS

JP          5-53893         3/1993
JP       2004-295860       10/2004

(Continued)

*Primary Examiner* — Than Nguyen
(74) *Attorney, Agent, or Firm* — Staas & Halsey LLP

(57) ABSTRACT

A storage control apparatus, that controls a storage apparatus that includes a storage drive in which a plurality of logical volumes are set, includes a storage unit that stores load information for each of the plurality of logical volumes, and a control unit that determines to-be-rebuilt volumes, which are targets to be rebuilt, from the plurality of logical volumes, sequentially selects a logical volumes for which a volume-specific taken time is estimated, determines, for each selected logical volume, a volume-specific start time at which a rebuild will be started, estimates, by using the volume-specific start time and the load information about the selected logical volume, the volume-specific taken time for rebuilding the selected logical volume, and totals the volume-specific taken time estimated for each selected logical volume to calculate a total taken time taken for rebuilding the to-be-rebuilt volumes.

10 Claims, 11 Drawing Sheets

(56) References Cited

U.S. PATENT DOCUMENTS

| | | | |
|---|---|---|---|
| 2008/0216078 A1* | 9/2008 | Miura | G06F 3/0611 |
| | | | 718/102 |
| 2009/0271506 A1 | 10/2009 | Arai et al. | |
| 2012/0059990 A1* | 3/2012 | Iida | 711/114 |
| 2013/0305083 A1* | 11/2013 | Machida | 714/4.1 |
| 2014/0215147 A1* | 7/2014 | Pan | 711/114 |

FOREIGN PATENT DOCUMENTS

| | | |
|---|---|---|
| JP | 2009-266106 | 11/2009 |
| JP | 2010-267037 | 11/2010 |
| JP | 2013-149209 | 8/2013 |

* cited by examiner

| HDD 1 | VOLUME A, VOLUME B, VOLUME C |
| HDD 2 | VOLUME A, VOLUME D, VOLUME E |
| HDD 3 | VOLUME A, VOLUME F |
| ⋮ | ⋮ |

| TIME AND DATE | READ IOPS | AVERAGE READ RESPONSE TIME (ms) | WRITE IOPS | AVERAGE WRITE RESPONSE TIME (ms) | ACCESS DESTINATION IDENTIFICATION INFORMATION | ... |
|---|---|---|---|---|---|---|
| JULY 1 AT 10:00 | 30 | 1 | 60 | 5 | VOLUME A | ... |
| JULY 1 AT 10:01 | 10 | 0.3 | 100 | 7 | VOLUME C | ... |
| JULY 1 AT 10:01 | 30 | 1 | 500 | 12 | VOLUME E | ... |
| JULY 1 AT 10:01 | 30 | 1 | 60 | 5 | VOLUME A | ... |
| ... | ... | ... | ... | ... | ... | ... |

| LOGICAL VOLUME A | | | | |
|---|---|---|---|---|
| LOAD PATTERN | VARIATION WIDTH | START TIME | DURATION | CYCLE |
| A | $\mu + 3\sigma$ OR MORE | AUGUST 25 AT 9:00 | 1 HOUR | 30 DAYS |
| B | $\mu + 3\sigma$ OR MORE | OCTOBER 10 AT 12:00 | 3 HOURS | 3 MONTHS |
| C | $\mu + \sigma$ OR MORE | JULY 2 AT 15:00 | 12 HOURS | 1 DAY |
| D | $\mu - \sigma$ OR LESS | JULY 9 AT 0:00 | 48 HOURS | 1 WEEK |

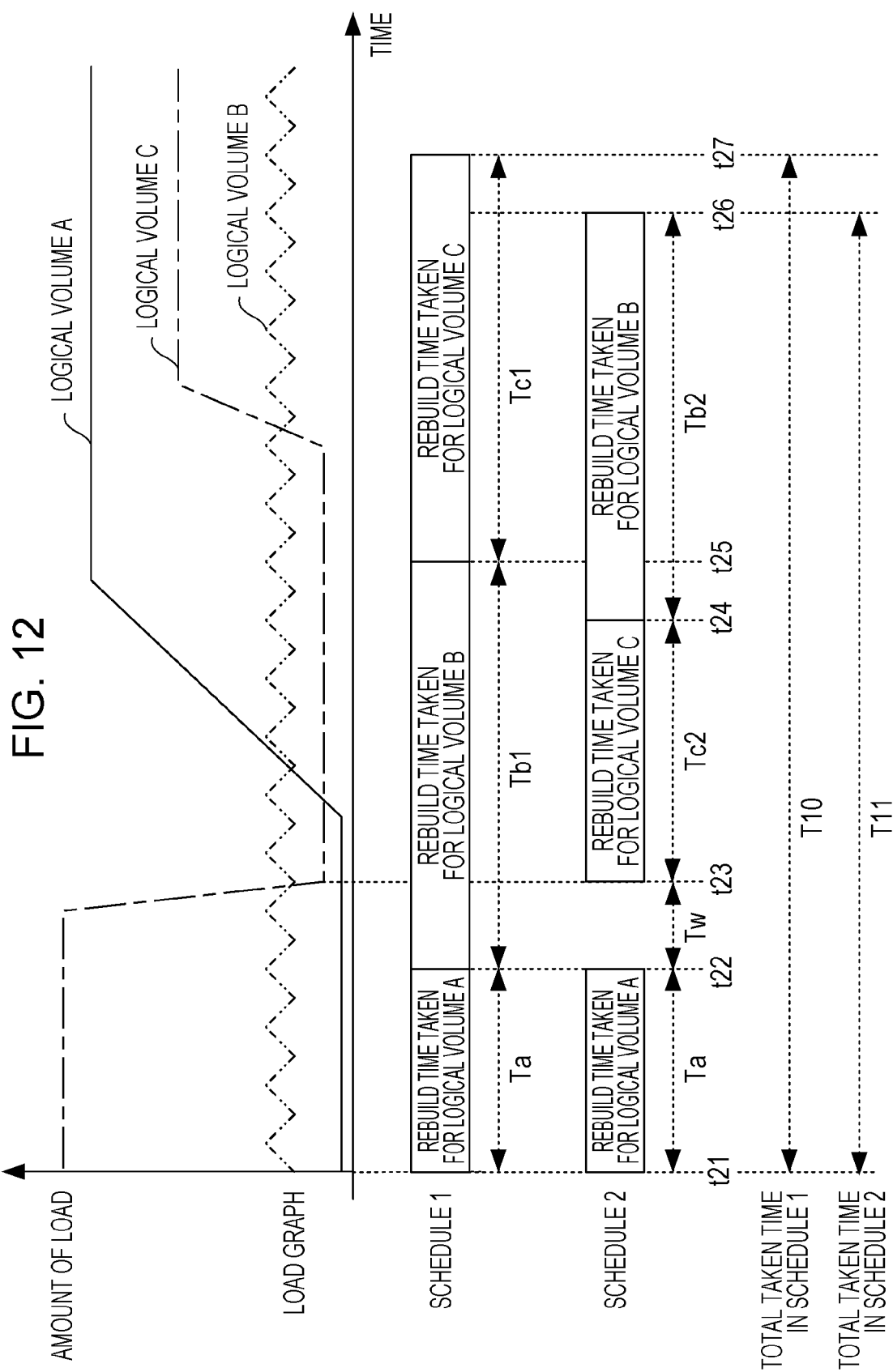

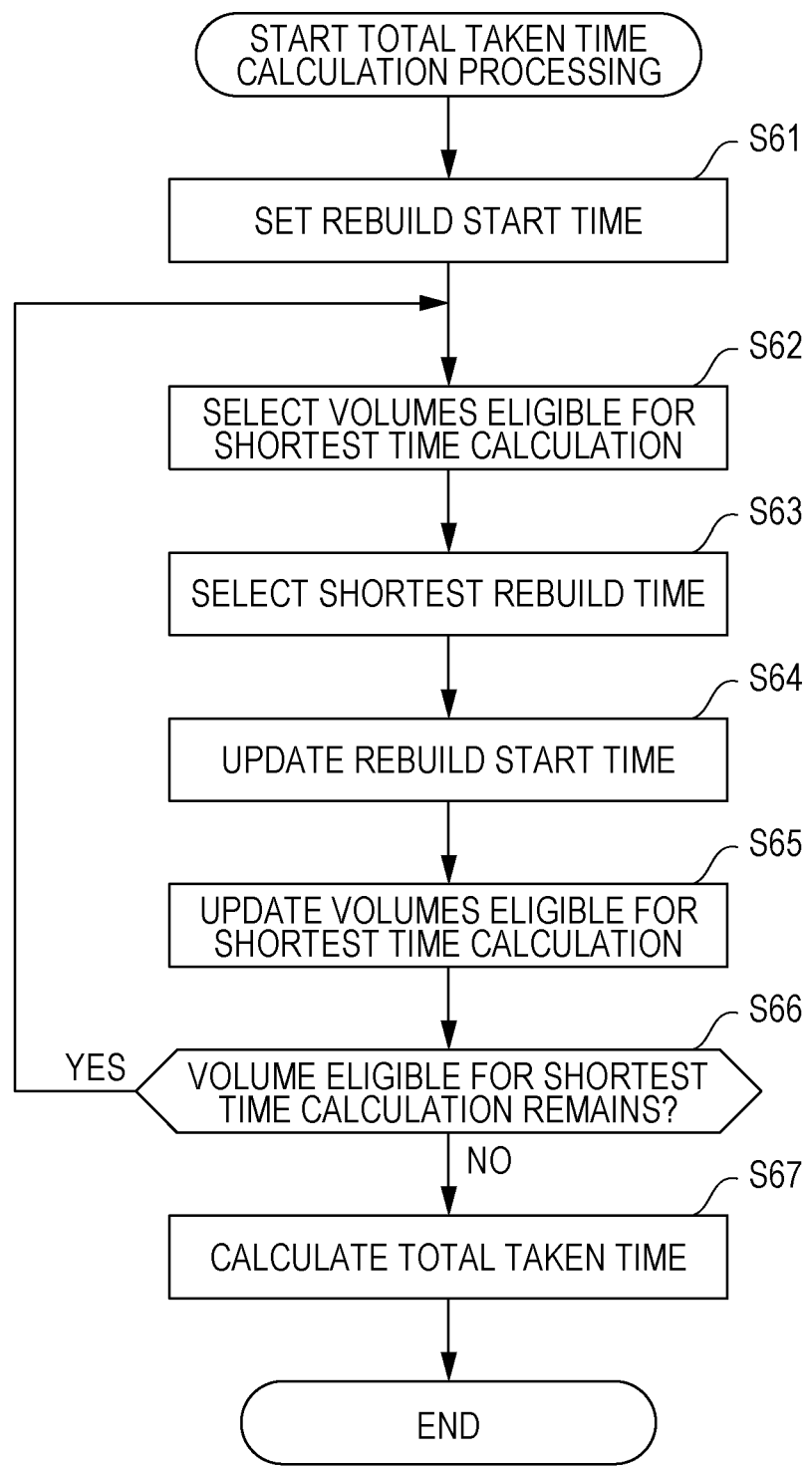

STORAGE CONTROL APPARATUS, METHOD, AND MEDIUM FOR SCHEDULING VOLUME RECOVERY

CROSS-REFERENCE TO RELATED APPLICATION

This application is based upon and claims the benefit of priority of the prior Japanese Patent Application No. 2014-177842, filed on Sep. 2, 2014, the entire contents of which are incorporated herein by reference.

FIELD

The embodiments discussed herein are related to a storage control apparatus and a storage medium storing a storage control program.

BACKGROUND

In a storage apparatus, a disk included in a group of redundant arrays of independent disks (RAID) may cause a failure. In this type of situation, to recover the redundancy of the RAID group, a controller module (storage control apparatus) included in the storage apparatus performs rebuild processing, by which data is restored on a spare disk.

The storage control apparatus calculates a time taken for rebuild processing (rebuild time) to determine a maintenance time taken to correct the disk failure.

Methods of calculating a rebuild time include a method in which drive load information about a disk is used in calculation. Examples of related art are described in Japanese Laid-open Patent Publication No. 2013-149209, Japanese Laid-open Patent Publication No. 2004-295860, Japanese Laid-open Patent Publication No. 5-53893, Japanese Laid-open Patent Publication No. 2010-267037, and Japanese Laid-open Patent Publication No. 2009-266106.

Recent storage apparatuses set logical volumes in storage drives in the storage apparatus, according to management work for use of data. Since a rebuild time taken for each logical volume varies with the load on host input-output (I-O), if a storage control apparatus calculates a rebuild time from a load history for each physical storage apparatus, calculation precision is not adequate.

In one aspect, an object of the present disclosure is to provide a storage control apparatus that can precisely calculate a rebuild time and a storage control program therefor.

SUMMARY

According to an aspect of the invention, a storage control apparatus, that controls a storage apparatus that includes a storage drive in which a plurality of logical volumes are set, includes a storage unit that stores load information for each of the plurality of logical volumes, and a control unit that determines to-be-rebuilt volumes, which are targets to be rebuilt, from the plurality of logical volumes, sequentially selects a logical volumes for which a volume-specific taken time is estimated, determines, for each selected logical volume, a volume-specific start time at which a rebuild will be started, estimates, by using the volume-specific start time and the load information about the selected logical volume, the volume-specific taken time for rebuilding the selected logical volume, and totals the volume-specific taken time estimated for each selected logical volume to calculate a total taken time taken for rebuilding the to-be-rebuilt volumes.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an example of history information in the second embodiment;

FIG. 7 illustrates an example of load analysis information in the second embodiment;

FIG. 12 illustrates an example of a relationship between logical volume loads and rebuilding schedules in the second embodiment; and FIG. 13 illustrates a flowchart for total taken time calculation processing in a third embodiment.

DESCRIPTION OF EMBODIMENTS

Embodiments will be described below in detail with reference to the drawings.

First Embodiment

Figure 1:
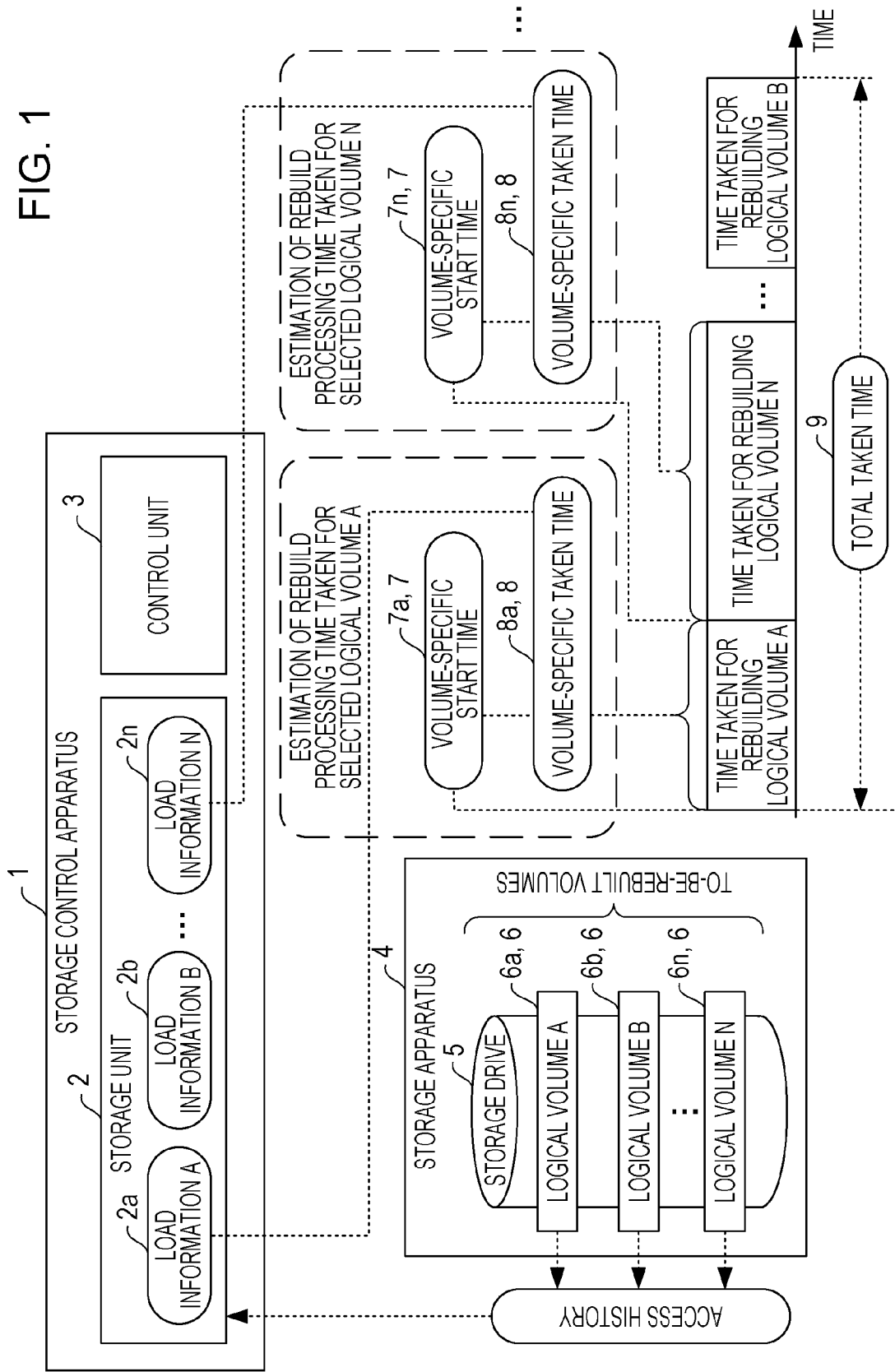
FIG. 1 illustrates an example of the structure of a storage control apparatus in a first embodiment.

A storage control apparatus in a first embodiment will be first described with reference to FIG. 1. FIG. 1 illustrates an example of the structure of the storage control apparatus in the first embodiment.

The storage control apparatus 1 controls a storage apparatus 4. The storage apparatus 4 includes a storage drive 5 in which a plurality of logical volumes 6 (6a, 6b, . . . , 6n) are set. The storage control apparatus 1 is one type of information processing apparatus and is, for example, a controller module for an apparatus based on redundant arrays of independent disks (RAID).

The storage control apparatus 1 includes a storage unit 2 and a control unit 3. The storage unit 2 can store load information items (2a, 2b, . . . , 2n), each of which corresponds to one logical volume 6. Examples of the storage unit 2 include hard disk drives (HDDs), various memories, and other storage devices. The load information (2a, 2b, . . . , 2n) is information about loads on the logical volumes 6. The load information (2a, 2b, . . . , 2n) is, for example, information in which information about accesses to the logical volumes 6, such as the number of reads and writes and response times, has been collected or information obtained by analyzing information about loads. The load information ($2a, 2b, \ldots, 2n$) is created from a history of accesses to a plurality of logical volumes 6. For example, load information A ($2a$) is load information about logical volume A.

The control unit 3 determines to-be-rebuilt volumes, which are targets to be rebuilt, from a plurality of logical volumes 6. For example, the control unit 3 determines logical volume A ($6a$), logical volume B ($6b$), ..., logical volume N ($6n$) as to-be-rebuilt volumes. To-be-rebuilt volumes may be all or part of the logical volumes 6 ($6a$, $6b$, ..., $6n$) set in the storage drive 5. When, for example, some physical storage units that have caused a failure are replaced, it suffices to handle, as to-be-rebuilt volumes, only logical volumes that have been loaded in those storage units.

The control unit 3 selects, from the to-be-rebuilt volumes, a logical volume 6 for which to estimate a volume-specific taken time 8. The volume-specific taken time 8 is predicted by the control unit 3 as a time taken for execution of rebuilding of a target logical volume 6. In estimation, the control unit 3 calculates a time predicted to be taken for execution of rebuilding. From the logical volumes 6 ($6a$, $6b$, ..., $6n$), the control unit 3 selects, for example, logical volume A ($6a$) for which the control unit 3 has not yet estimated the volume-specific taken time 8. The control unit 3 may select a logical volume 6 as a to-be-rebuilt volume according to predetermined conditions or according to load information ($2a, 2b, \ldots, 2n$). Alternatively, the control unit 3 may use another method to select a logical volume 6 as a to-be-rebuilt volume. The predetermined conditions are the storage capacity of the logical volume 6, information about the use of the logical volume 6, the turn of identification information assigned to the logical volume 6, and the like.

The control unit 3 determines a volume-specific start time 7 at which rebuilding will be started in a selected logical volume 6. The volume-specific start times 7 ($7a, \ldots, 7n$) is a time at which rebuilding of a selected logical volume 6 is started. The control unit 3 can determine the volume-specific start time 7 according to the state of the storage drive 5 in which the selected logical volume 6 is set. Examples of the state of the storage drive 5 are an abnormal state and an in-use state. If the control unit 3 detects an abnormal state, the control unit 3 can determine the current time as the volume-specific start time 7. The control unit 3 can also determine a plurality of candidate times suitable for an in-use state as volume-specific start times 7.

The control unit 3 uses the volume-specific start time 7 and load information ($2a, 2b, \ldots, 2n$) to estimate the volume-specific taken time 8 that matches load variations. After having estimated the volume-specific taken time 8 for each to-be-rebuilt volume, the control unit 3 totals the estimated volume-specific taken times 8 to calculate a total taken time 9. The total taken time 9 is a value obtained by totaling the volume-specific taken times 8 ($8a, \ldots, 8n$) for predetermined logical volumes 6 including in the to-be-rebuilt volumes. Usually, all logical volumes 6 included in the to-be-rebuilt volumes can be taken as the predetermined logical volumes 6. However, some logical volumes can be excluded from the predetermined logical volumes 6 when their in-use areas are small with respect to their capacities and their rebuild times can thereby be ignored or when their rebuild times can be approximated from a fixed value such as a logical performance value.

Thus, the storage control apparatus 1 can precisely calculate a time taken for rebuild processing. Calculation of the total taken time 9 will be described here by using an example. The control unit 3 selects logical volume A ($6a$) from to-be-rebuilt volumes. The control unit 3 uses volume-specific start time $7a$ and load information A ($2a$) to estimate volume-specific taken time $8a$. Volume-specific start time $7a$ is, for example, the current time.

Next, the control unit 3 selects logical volume N ($6n$) from the to-be-rebuilt volumes excluding logical volume A. The control unit 3 determines volume-specific start time $7n$ from volume-specific start time $7a$ and volume-specific taken time $8a$. The control unit 3 uses volume-specific start time $7n$ and load information N ($2n$) to estimate volume-specific taken time $8n$.

As described above, the control unit 3 determines the volume-specific start time 7 for each to-be-rebuilt volume in succession and estimates the volume-specific taken time 8. If logical volume B ($6b$) is left as a last one, the control unit 3 selects logical volume B ($6b$). As with logical volume N ($6n$), the control unit 3 determines the volume-specific start time 7 and estimates the volume-specific taken time 8. A rebuild termination time is a time obtained by adding the volume-specific taken time 8 for logical volume B ($6b$) to its volume-specific start time 7.

As described above, the control unit 3 can calculate the total taken time 9 by totaling the volume-specific taken times 8 for the to-be-rebuilt volumes.

Second Embodiment

Figure 2:
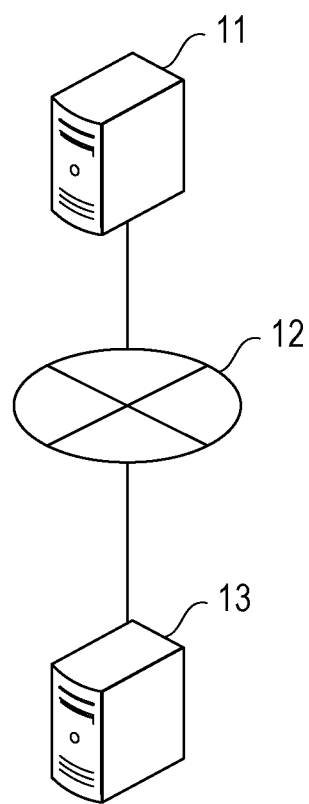
FIG. 2 illustrates an example of the structure of a storage system in a second embodiment.

Next, a storage system in a second embodiment will be described with reference to FIG. 2. FIG. 2 illustrates an example of the structure of the storage system in the second embodiment.

The storage system 10 includes a host 11 and a RAID apparatus 13, which is connected to the host 11 through a network 12. The storage system 10 writes data to the RAID apparatus 13 or reads out data from the RAID apparatus 13, in response to an I-O request (input-output request) issued from the host 11. The storage system 10 may include a plurality of hosts 11 and a plurality of RAID apparatuses 13.

Figure 3:
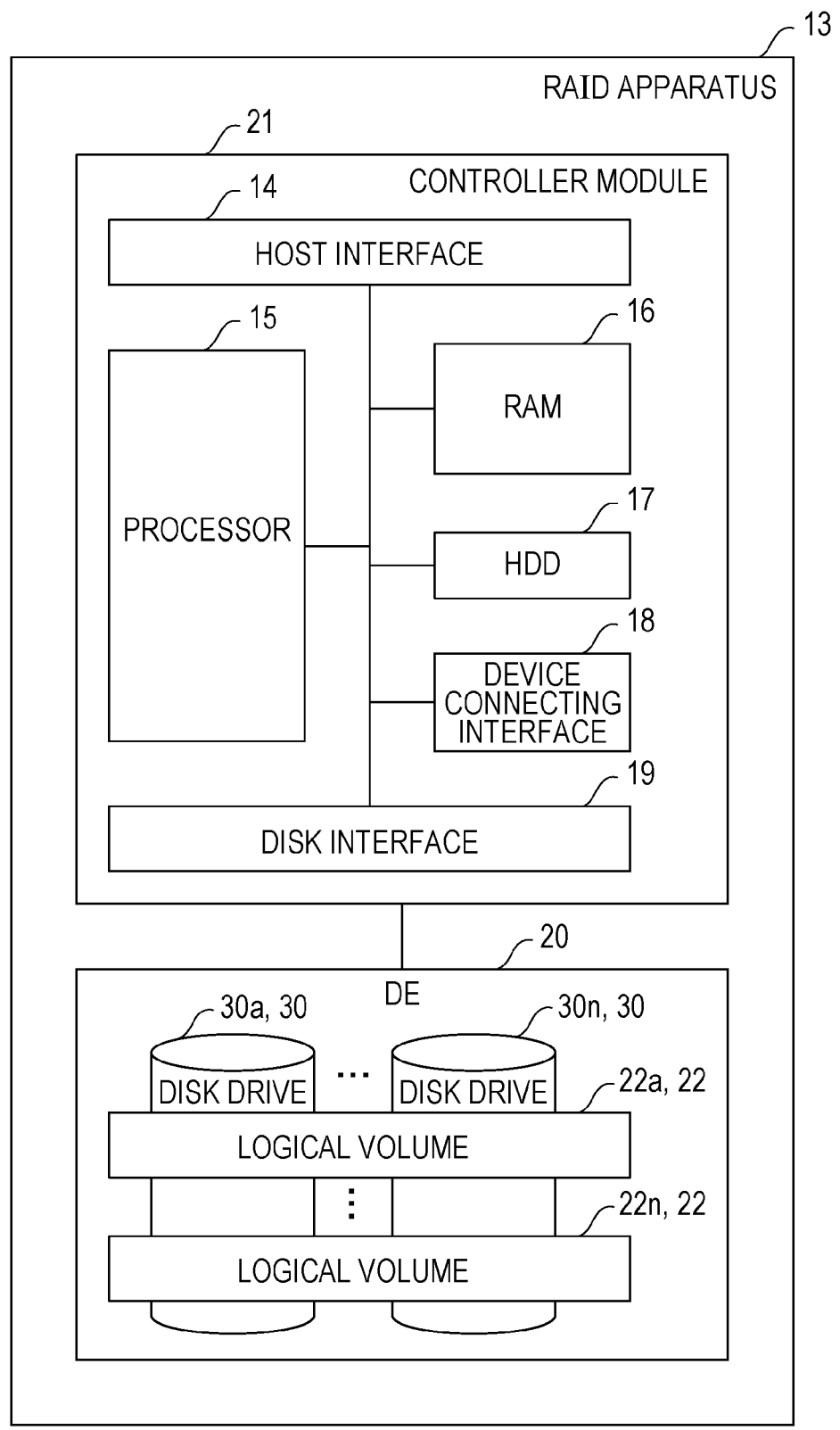
FIG. 3 illustrates an example of the hardware structure of a RAID apparatus in the second embodiment.

Next, the hardware structure of the RAID apparatus 13 will be described with reference to FIG. 3. FIG. 3 illustrates an example of the hardware structure of the RAID apparatus in the second embodiment.

The RAID apparatus 13 includes a controller module 21 and a disk enclosure (DE) 20. The RAID apparatus 13 may include a plurality of controller modules 21 and a plurality of DEs 20.

The controller module 21 includes a host interface 14, a processor 15, a random-access memory (RAM) 16, an HDD 17, a device connecting interface 18, and a disk interface 19.

The whole of the controller module 21 is controlled by the processor 15. The RAM 16 and a plurality of peripherals are connected to the processor 15 through a bus. The processor 15 may be a multi-core processor that includes two or more processors. If a plurality of controller modules 21 is included, a master-servant relationship may be determined among the controller modules 21, and the processor 15 in the master controller module 21 may control all servant controller modules 21 and the whole of the RAID apparatus 13.

The processor 15 is, for example, a central processing unit (CPU), a microprocessing unit (MPU), a digital signal processor (DSP), an application-specific integrated circuit (ASIC), or a programmable logic device (PLD).

The RAM 16 is used as a main storage device for the controller module 21. At least part of an operation system (OS) program and applications executed by the processor 15 is temporarily stored in the RAM 16. Various types of data used in processing by the processor 15 are also temporarily stored in the RAM 16. The RAM 16 functions as a cache memory for the processor 15.

The peripherals connected to the bus include the host interface 14, HDD 17, device connecting interface 18, and disk interface 19. The host interface 14 transmits data to the host 11 and receives data from it, through the network 12.

The HDD 17 magnetically writes data to a built-in disk and magnetically reads out data from it. The HDD 17 is used as an auxiliary storage device for the RAID apparatus 13. The OS program, application programs, and various types of data are stored in the HDD 17. A flash memory or another semiconductor storage device may be used as an auxiliary storage device.

The device connecting interface 18 is a communication interface used to connect peripherals to the controller module 21. For example, a memory device and a memory reader-writer (either being not illustrated) can be connected to the device connecting interface 18. The memory device is a recording medium having a function that enables communication with the device connecting interface 18. The memory reader-writer is a device that writes data to a memory card and reads out data from it. An example of a memory card is a card-type recording medium.

A display unit (not illustrated) may be connected to the device connecting interface 18. In this type of situation, the device connecting interface 18 has a function that displays information on the display unit in response to a command from the processor 15.

A keyboard and a mouse (either being not illustrated) may be connected to the device connecting interface 18. In this type of situation, the device connecting interface 18 receives signals from the keyboard and mouse and transmits these signals to the processor 15. A mouse is an example of a pointing device. Another pointing device may be used. Examples of other pointing devices are a touch panel, a tablet, a touch pad, and a trackball.

An optical drive unit (not illustrated) may be connected to the device connecting interface 18. An optical drive unit uses laser beams or the like to read out data recorded on an optical disk. An optical disk is a portable recording medium on which data is recorded so that it can be read out due to reflection of light. Examples of optical disks include a digital versatile disc (DVD), a DVD-RAM, a compact disc read-only memory (CD-ROM), a CD-recordable (CD-R), and a CD-rewritable (CD-RW). The disk interface 19 transmits data to the DE 20 and receives data from it. The controller module 21 is connected to the DE 20 through the disk interface 19.

The DE 20 includes one or more disk drives 30 (30*a*, ..., 30*n*). The DE 20 stores data in response to a command from the controller module 21. The disk drive 30 is a storage drive; it is, for example, an HDD or a solid state drive (SSD). In the disk drive 30, one or more logical volumes 22 (22*a*, ..., 22*n*) are set. Logical volumes 22 may be set across a plurality of disk drives 30.

By using the hardware structure described above, the processing functions of the RAID apparatus 13 can be implemented. The RAID apparatus 13 implements its processing functions by, for example, executing programs recorded on a computer-readable recording medium. Programs in which processing executed by the RAID apparatus 13 are coded can be recorded in various recording media in advance. For example, programs executed by the RAID apparatus 13 can be stored in the HDD 17 in advance. During the execution of a program, the processor 15 loads at least part of the program stored in the HDD 17 into the RAM 16. The programs executed by the RAID apparatus 13 can also be recorded on an optical disk, in a memory device, or on a memory card in advance. After a program stored in a portable recording medium has been installed in the HDD 17 under control by, for example, the processor 15, the program becomes executable. It is also possible for the processor 15 to directly read out a program from the portable recording medium.

Figures 4, 5:
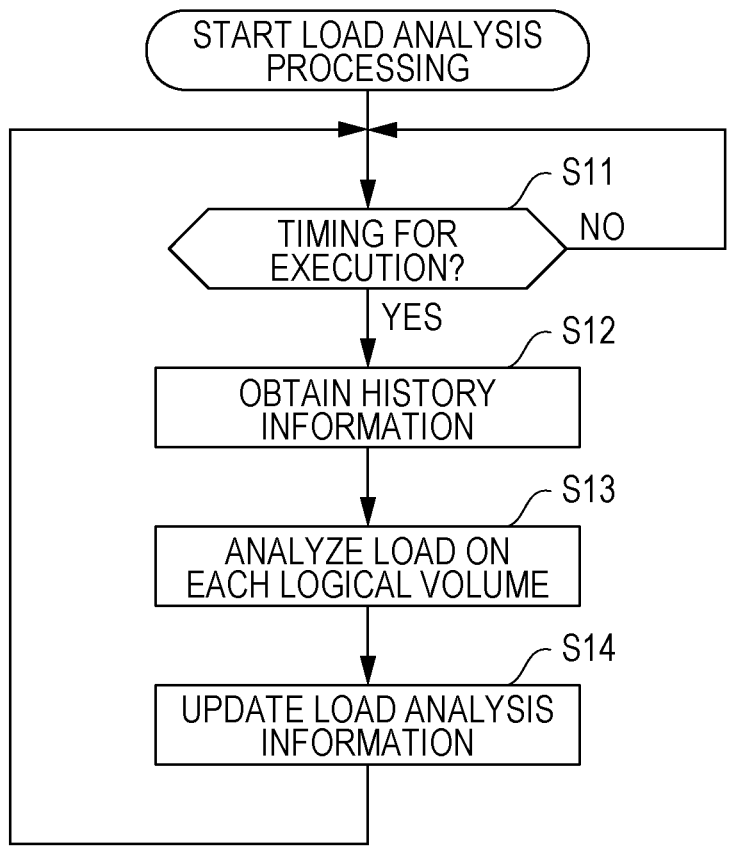
FIG. 4 illustrates an example of logical volume setting information in the second embodiment.
FIG. 5 illustrates a flowchart for load analysis processing in the second embodiment.

Next, logical volume setting information will be described with reference to FIG. 4. FIG. 4 illustrates an example of logical volume setting information in the second embodiment.

The logical volume setting information 201 is information with which logical volumes 22 set in a disk drive 30 can be identified.

The logical volume setting information 201 includes identification information about disk drives 30 and identification information about logical volumes 22. Identification information about a disk drive 30 is, for example, a volume group, which is set in the disk drive 30. Identification information about a logical volume 22 is information with which the logical volume 22, which is set in a disk drive 30, can be uniquely identified. An example of identification information about a logical volume 22 is a logical unit number (LUN). The logical volume setting information 201 in FIG. 4 indicates that volume A, volume B, and volume C are set in volume group HDD1 as logical volumes 22. The logical volume setting information 201 is set and is stored in the HDD 17 by a maintenance personnel in advance.

Load analysis processing in the RAID apparatus 13 will be described with reference to FIGS. 5 to 7. First, load analysis processing in the second embodiment will be described with reference to FIG. 5. FIG. 5 is a flowchart for load analysis processing in the second embodiment.

In load analysis processing, a load on each logical volume 22 is analyzed according to an access history. The access history is history information about accesses to each logical volume 22. For example, the access history is information that is collected at time intervals of, for example, one minute and accumulated. After the RAID apparatus 13 has been activated, the control unit (processor 15) in the RAID apparatus 13 executes load analysis processing and performs load analysis at a predetermined timing according to the history information.

Step S11: The control unit determines whether a timing to execute load analysis has been effected. If the control unit determines that a timing to perform load analysis has been effected, the control unit proceeds to step S12. If the control unit determines that a timing to perform load analysis has not been effected, the control unit waits until a timing to perform load analysis is affected. The control unit may affect a timing to perform load analysis when an event trigger (such as acceptance of a command from a maintenance personnel) is generated when or a timer trigger (at intervals of one day, one week, one month, or the like) is generated.

Step S12: The control unit obtains history information about the logical volume 22. The history information includes a history of accesses to logical volumes 22. The history information will be described later with reference to FIG. 6.

Step S13: The control unit analyzes a load on each logical volume 22 with reference to the obtained history information. To analyze the load, the control unit extracts a load pattern from time-series load variations in the logical volume 22.

A load pattern is represented by, for example, times at which the number of accesses is absolutely or relatively large or small or absolutely or relatively short or long response times. An absolute or relative variation may be determined according to, for example, an average, a deviation value, or a statistical value such as in dispersion.

Step S14: The control unit updates load analysis information according to load analysis results. The load analysis information indicates results of analysis of loads on the logical volume 22. The load analysis information will be described later with reference to FIG. 7.

Next, history information will be described with reference to FIG. 6. FIG. 6 illustrates an example of history information in the second embodiment.

The history information 202 is an example of history information. The history information 202 is information about a history of accesses to each logical volume 22. The history information 202 is stored in the HDD 17 and is used for load analysis.

The history information 202 is created by the control unit; to create the history information 202, the control unit monitors accesses from the host 11 to logical volumes 22 and records the accesses. The history information 202 includes date and time information with which a certain monitoring period can be identified and also includes access information about accesses to logical volumes 22. The time and date information is, for example, a start time of a monitoring period. A start time of a monitoring period enables the monitoring period to be identified. The access information includes the number of accesses for each access type (read or write), response times, and access destination identification information. The access destination identification information is information with which a disk drive 30 or logical volume 22 that has been accessed can be identified.

The history information 202 includes dates and times as date and time information, and also includes, as access information, read inputs-outputs per second (IOPS), average read response times (ms), write IOPS, average write response times (ms), and access destination identification information. If the monitoring period is one minute, a date and time of July 1 at 10:00, for example, indicates that monitoring started for one minute on July 1 at 10:00. A read IOPS of 30 indicates that the number of read access requests executed for volume A during the monitoring period was 30 per unit time (one second, for example). An average read response time (ms) of 1 indicates that the average response time for read access requests executed for volume A during the monitoring period was 1 ms. A write IOPS of 60 indicates that the number of write access requests executed for volume A during the monitoring period was 60 per unit time. An average write response time (ms) of 5 indicates that the average response time for write access requests executed for volume A during the monitoring period was 5 ms. Access destination identification information "volume A" indicates that the accessed logical volume 22 was volume A.

Next, load analysis information will be described with reference to FIG. 7. FIG. 7 illustrates an example of load analysis information in the second embodiment.

The load analysis information 203 is an example of load analysis information. The load analysis information 203, which indicates load analysis results for a particular logical volume 22, includes identification information about the logical volume 22 and a load pattern of the logical volume 22. The load analysis information 203 is stored in the HDD 17 and is used for calculation of a rebuild time taken for each logical volume 22.

The load analysis information 203 is created in load analysis processing, according to the history information 202. The load analysis information 203 includes load patterns A, B, C, and D that were detected for logical volume A. Each load pattern is represented by a variation width, a start time, a duration, and a cycle. For example, load pattern A is presented by a variation width of $\mu$ (load average value)+$3\sigma$ (load standard deviation) or more, a start time of August 25 at 9:00, a duration of one hour, and a cycle of 30 days. Load pattern A indicates that, in logical volume A, a load with a variation range of $\mu$+$3\sigma$ or more will continue for one hour, starting from August 25 at 9:00. Load pattern A also indicates that, in logical volume A, the cycle of the load is 30 days. The start time and cycle may be adjusted according to calendar information or other information. In the load analysis information 203, a correspondence is made between a predicted time at which the logical volume 22 will be accessed and information about the amount of access (absolute number of accesses, relative number of accesses, average of accesses, deviation value of accesses, and the like).

Figure 8:
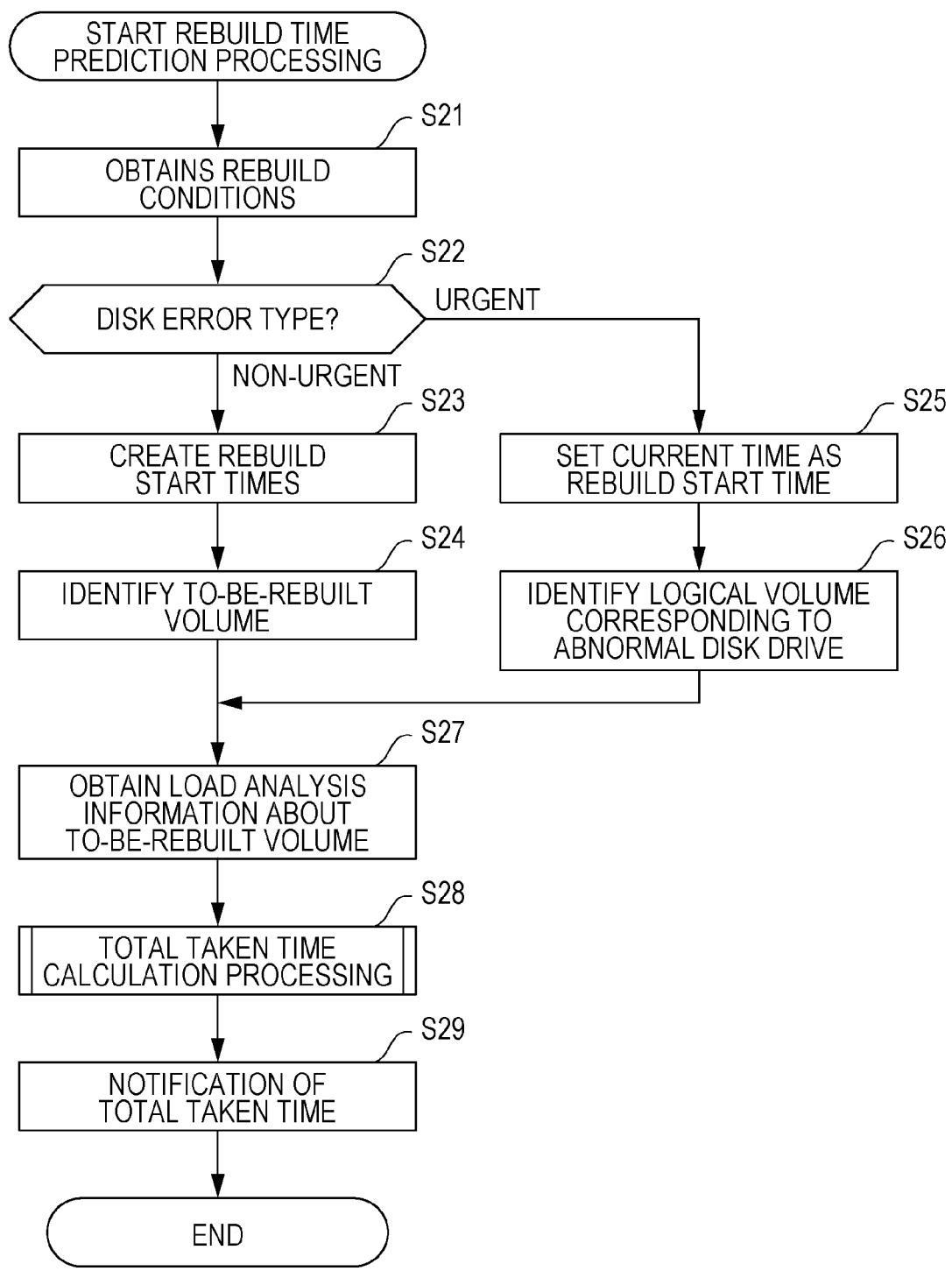
FIG. 8 illustrates a flowchart for rebuild time prediction processing in the second embodiment.

Next, rebuild time prediction processing in the second embodiment will be described with reference to FIG. 8. FIG. 8 illustrates a flowchart for rebuild time prediction processing in the second embodiment.

In rebuild time prediction processing, the RAID apparatus 13 predicts a rebuild time taken for a to-be-rebuilt volume. The control unit (processor 15) in the RAID apparatus 13 executes rebuild time prediction processing in response to a command to obtain a rebuild time.

Step S21: The control unit obtains rebuild conditions, under which a rebuild time is calculated. The control unit may obtain rebuild conditions stored in the HDD 17 or may obtain rebuild conditions entered by a maintenance personnel.

Examples of rebuild conditions stored in the HDD 17 are the logical volume setting information 201, the amount of data stored in disk drives 30, and internal load information. The internal load information is load information generated in rebuild processing, copy back processing, format processing, or other processing executed by the RAID apparatus 13. Conditions entered by a maintenance personnel are identification information about a to-be-rebuilt volume, a rebuild start time, and the like. The rebuild start time is a time of day at which the rebuild start time is created.

Step S22: The control unit determines a disk error type. If the control unit determines that the disk error type is non-urgent, the control unit proceeds to step S23. If the disk error type is urgent, the control unit proceeds to step S25.

The disk error type is the type of an error detected by the control unit in a disk drive 30. There are various error types from a minor disk error to major disk error. An example of a major disk error is an HDD head failure, a firmware failure in a disk drive 30, the inability to recognize a disk drive 30, or another state in which data restoration is very difficult.

If the disk error type indicates a major disk error, the control unit determines that the disk error type is urgent. If there is no error in the disk drive 30 or the disk error type does not indicate a major disk error, the control unit determines that the disk error type is non-urgent. Information about the disk error type is stored in, for example, the HDD 17.

Step S23: The control unit creates one or more rebuild start times. For example, the control unit creates a plurality of rebuild start times (0 o'clock, 4 o'clock, 8 o'clock, . . . , for example) at a predetermined time interval (four-hour interval, for example), starting from the rebuild start time (0 o'clock, for example) obtained in step S21. Since the control unit creates a plurality of rebuild start times, more rebuild start time choices are available.

Step S24: The control unit identifies a to-be-rebuilt volume with reference to the identification information about the to-be-rebuilt volume, the identification information being included in the obtained rebuild conditions.

Step S25: The control unit sets the current time as the new rebuild start time.

Step S26: The control unit identifies a logical volume corresponding to an abnormal disk drive as a to-be-rebuilt volume. The control unit can identify a logical volume 22 from the logical volume setting information 201 and identification information about the disk drive 30 associated with information about the disk error type.

Step S27: The control unit obtains the load analysis information 203 about the to-be-rebuilt volume.

Step S28: The control unit executes total taken time calculation processing, in which the control unit calculates a total taken time from rebuild conditions, rebuild start times, and the load analysis information 203. Total taken time calculation processing will be described later with reference to FIG. 9.

Step S29: The control unit submits a notification of the total taken time and terminates the total taken time calculation processing. To submit a notification, the control unit may display the total taken time on the display unit or may send the total taken time through the network. Alternatively, the control unit may submit a notification of the total taken time together with a notification of a rebuild schedule for the to-be-rebuilt volumes.

Figure 9:
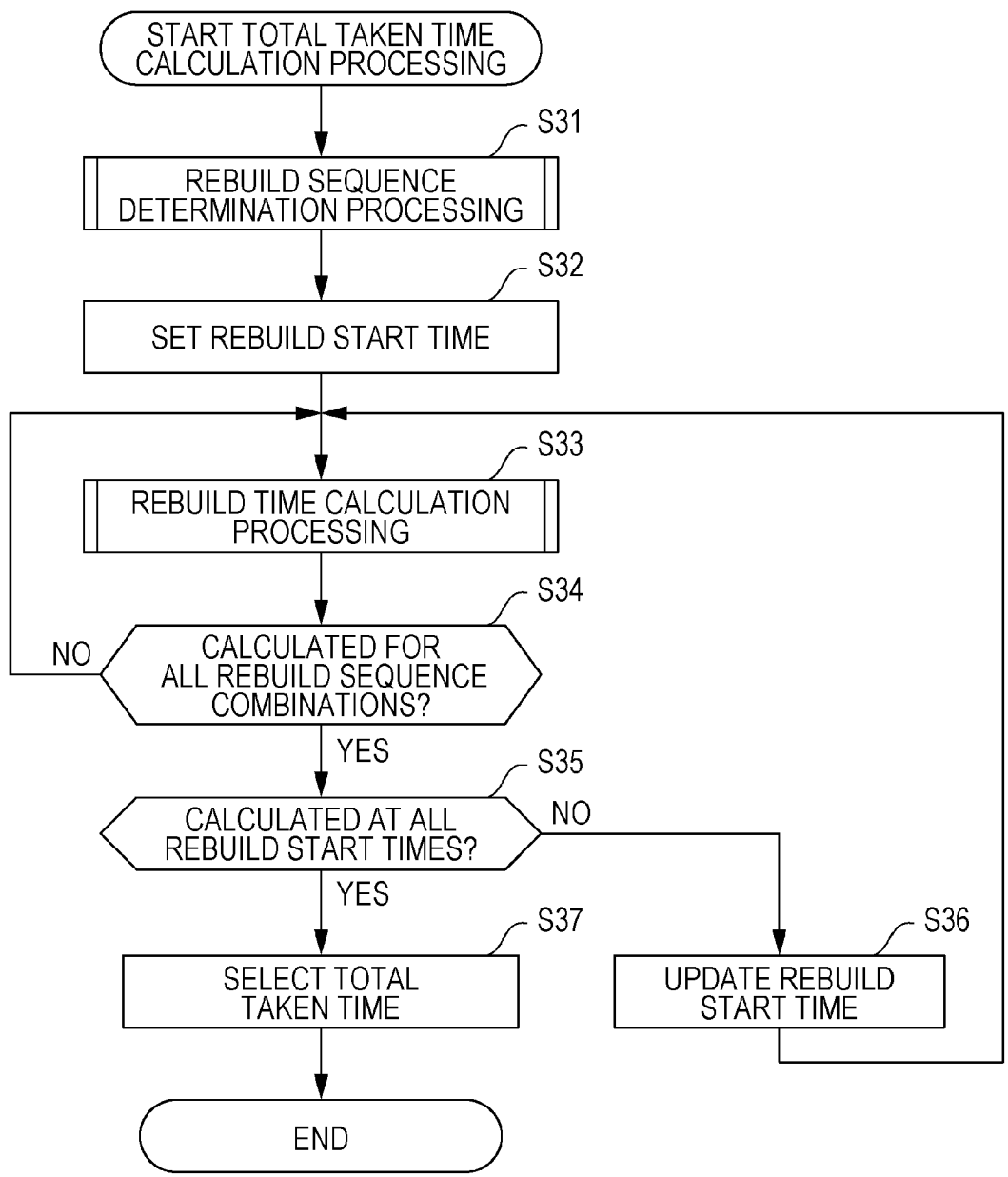
FIG. 9 illustrates a flowchart for total taken time calculation processing in the second embodiment.

Next, total taken time calculation processing in the second embodiment will be described with reference to FIG. 9. FIG. 9 illustrates a flowchart for total taken time calculation processing in the second embodiment.

In total taken time calculation processing, a total taken time is calculated from rebuild conditions, rebuild start times, and the load analysis information 203.

Total taken time calculation processing is executed by the control unit (processor 15) included in the RAID apparatus 13 in step S28 in rebuild time prediction processing.

Step S31: The control unit executes rebuild sequence determination processing. In rebuild sequence determination processing, one or more combinations of rebuild sequences of to-be-rebuilt volumes are determined. Rebuild sequence determination processing will be described later with reference to FIG. 10.

Step S32: The control unit selects one rebuild start time from the rebuild start times created in step S23, and sets the selected one.

Step S33: The control unit executes rebuild time calculation processing. In rebuild time calculation processing, to calculate a total taken time, a rebuild time taken for each to-be-rebuilt volume is totaled for one combination of rebuild sequences of to-be-rebuilt volumes, according to the rebuild sequences and rebuild start times. Rebuild time calculation processing will be described later with reference to FIG. 11.

Step S34: The control unit determines whether the control unit has calculated rebuild times based on rebuild sequences for all rebuild sequence combinations. If the control unit has calculated rebuild times for all rebuild sequence combinations, the control unit proceeds to step S35. If there is a rebuild sequence combination for which rebuild times have not yet been calculated, the control unit returns to step S33.

Step S35: The control unit determines whether the control unit has calculated a rebuild time for all rebuild start times created in step S23. If the control unit has calculated a rebuild time for all rebuild times, the control unit proceeds to step S37. If the control unit has not yet calculated a rebuild time for all rebuild times, the control unit proceeds to step S36.

Step S36: The control unit selects one rebuild start time that has not yet been set, updates it, and sets it as a new rebuild start time.

Step S37: The control unit selects a total taken time that is eligible for notification from total taken times for all rebuild sequence combinations, and terminates the total taken time calculation processing.

The control unit may select, from the calculated total taken times, two or more total taken times as targets eligible for notification. For example, the control unit may select the shortest rebuild time, the longest rebuild time, and an intermediate value of the rebuild times. The control unit may also select the shortest rebuild time and the longest rebuild time for each rebuild start time.

Figure 10:
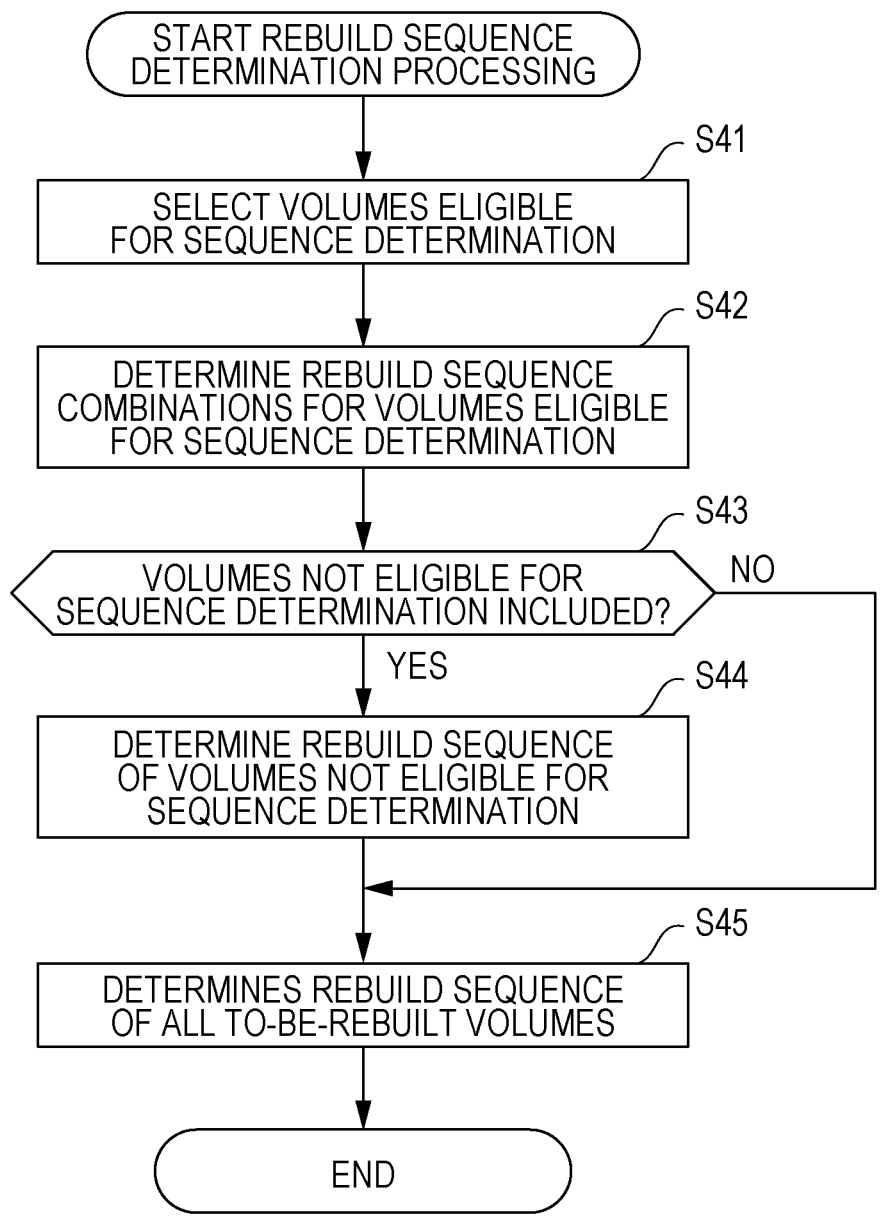
FIG. 10 illustrates a flowchart for rebuild sequence determination processing in the second embodiment.

Next, rebuild sequence determination processing in the second embodiment will be described with reference to FIG. 10. FIG. 10 illustrates a flowchart for rebuild sequence determination processing in the second embodiment.

In rebuild sequence determination processing, one or more combinations of rebuild sequences of to-be-rebuilt volumes are determined. Rebuild sequence determination processing is executed by the control unit (processor 15) included in the RAID apparatus 13 in step S31 in total taken time calculation processing.

Step S41: According to predetermined selection conditions, the control unit selects to-be-rebuilt volumes as to-be-rebuilt volumes eligible for combination sequence determination (simply referred to below as volumes eligible for sequence determination) and as to-be-rebuilt volumes not eligible for combination sequence determination (simply referred to below as the volumes not eligible for sequence determination).

If, for example, there are a large number of to-be-rebuilt volumes, the number of rebuild sequence combinations becomes huge, making it difficult to perform calculation for all combinations. If, therefore, there are a large number of to-be-rebuilt volumes, the control unit selects to-be-rebuilt volumes that are predicted to occupy at least a predetermined ratio to the total taken time as volumes eligible for sequence determination and selects to-be-rebuilt volumes that are predicted to occupy a ratio lower than predetermined ratio to the total taken time as volumes not eligible for sequence determination. Thus, the control unit can reduce a processing load on rebuild sequence determination. Examples of the predetermined selection conditions include the sizes of volumes eligible for sequence determination, the amount of data in the disk drive 30 in which volumes eligible for sequence determination are set, load patterns, host I-O loads, and the maximum number of volumes eligible for sequence determination.

Step S42: The control unit determines rebuild sequence combinations for volumes eligible for sequence determination. For example, three logical volumes (logical volume A, logical volume B, and logical volume C, which will be simply represented below as A, B, and C) are assumed to be volumes eligible for sequence determination. Then, the control unit determines, as one of rebuild sequence combinations, a sequence in which a rebuild is executed first for A, secondly for B, and thirdly for C (this sequence will be represented below as A→B→C). Similarly, the control unit determines a plurality of other rebuild sequences such as A→C→B and C→B→A.

Step S43: The control unit determines whether there are volumes not eligible for sequence determination. If there is a volume not eligible for sequence determination, the control unit proceeds to step S44. If there is no volume not eligible for sequence determination, the control unit proceeds to step S45.

Step S44: The control unit lists volumes not eligible for sequence determination according to a predetermined rule and determines one rebuild sequence. For example, the control unit lists volumes not eligible for sequence determination according to their sizes or the like.

Step S45: The control unit determines a rebuild sequence of all volumes eligible for sequence determination. In rebuild sequence determination, the control unit can give priority to a sequence of volumes eligible for sequence determination. For example, the control unit determines a rebuild sequence of all volumes eligible for sequence determination by listing volumes not eligible for sequence determination after volumes eligible for sequence determination.

Figure 11:
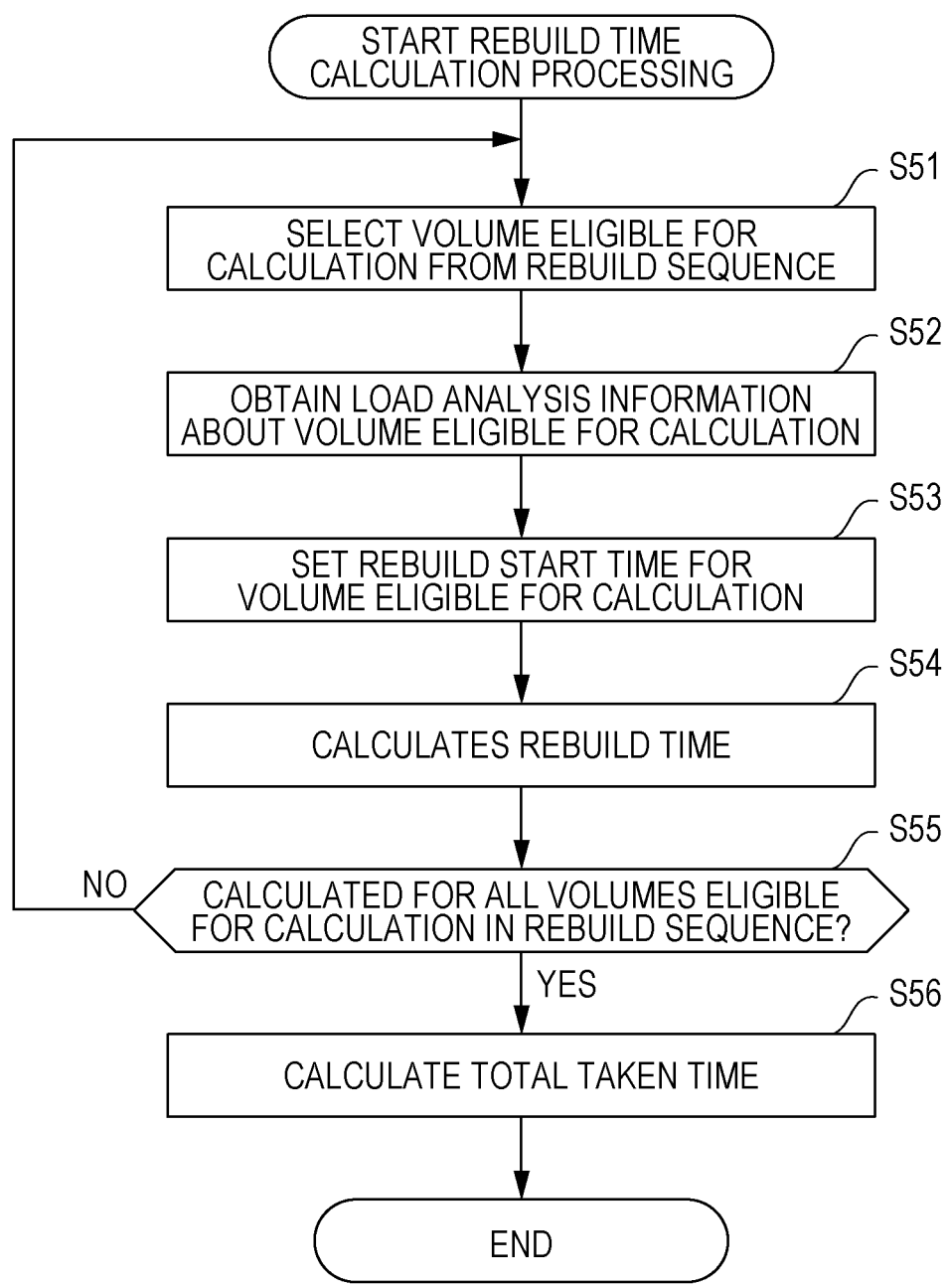
FIG. 11 illustrates a flowchart for rebuild time calculation processing in the second embodiment.

Next, rebuild time calculation processing in the second embodiment will be described with reference to FIG. 11. FIG. 11 illustrates a flowchart for rebuild time calculation processing in the second embodiment.

In rebuild time calculation processing, a total taken time is calculated for one rebuild sequence combination of to-be-rebuilt volumes by totaling a rebuild time taken for each to-be-rebuilt volume according to a rebuild sequence and a rebuild start time. Rebuild sequence determination processing is executed by the control unit (processor 15) included in the RAID apparatus 13 in step S33 in total taken time calculation processing.

Step S51: The control unit selects a volume eligible for rebuild time calculation (simply referred to below as the volume eligible for calculation) from a rebuild sequence.

Step S52: The control unit obtains the load analysis information 203 about the volume eligible for calculation.

Step S53: The control unit sets the rebuild start time for the volume eligible for calculation at the top of the rebuild sequence as the rebuild start time that has been set in step S32, and also sets the rebuild time taken for the next volume eligible for calculation as a rebuild termination time for the preceding volume eligible for calculation. If the rebuild sequence is, for example, A→B→C, the control unit sets the rebuild start time for A as the rebuild start that has been set in step S32, and sets the rebuild start time for B as the rebuild termination time for A (the rebuild termination time is a time obtained by adding the rebuild time taken for A to the rebuild start time for A). Similarly, the control unit sets the start time for C as the rebuild termination time for B.

The control unit may add a predetermined wait (wait time) to a rebuild start time. When the control unit sets a wait time according to the load analysis information 203, the control unit can also execute a rebuild during a time while the load of a volume eligible for calculation is low.

Step S54: The control unit calculates a rebuild time taken for a volume eligible for calculation. When calculating a rebuild time taken for a volume eligible for calculation, the control unit may add a delay time based on loads such as a host I-O load and an internal load to a rebuild time that can be calculated by using a data transfer rate.

Step S55: The control unit determines whether a rebuild time has been calculated for all volumes eligible for calculation in the rebuild sequence. If a rebuild time has been calculated for all volume eligible for calculation, the control unit proceeds to step S56. If a rebuild time has not been calculated for all volume eligible for calculation, the control unit returns to step S51.

Step S56: The control unit calculates a total taken time according to the rebuild times calculated for all volume eligible for calculation in the rebuild sequence. If the rebuild sequence is, for example, A→B→C, the control unit may take the total of the rebuild times taken for A, B, and C as the total taken time. The control unit may also take a time from when the rebuild start time for A to the rebuild termination time for C as the total taken time.

Next, a relationship between logical volume loads and rebuilding schedules in the second embodiment will be described with reference to FIG. 12. FIG. 12 illustrates an example of a relationship between logical volume loads and rebuilding schedules in the second embodiment.

The load graph represents a relationship between the amount of load and time for three logical volumes 22 (logical volume A, logical volume B, and logical volume C, which will be simply represented below as A, B, and C, as described above). The load graph represents load varying patterns, for the logical volumes 22, illustrated according to the load analysis information. Schedule 1 is an example of rebuild scheduling in the second embodiment. Schedule 2 is an example of rebuild scheduling in a variation of the second embodiment.

First, schedule 1 will be described. Schedule 1 indicates a case in which a rebuild is executed first for A, secondly for B, and thirdly for C.

Rebuild time Ta, which is a rebuild time taken for A, indicates that a rebuild starts at time t21 and terminates at time t22. Rebuild time Tb1, which is a rebuild time taken for B, indicates that a rebuild starts at time t22 and terminates at time t25. Rebuild time Tc1, which is a rebuild time taken for C, indicates that a rebuild starts at time t25 and terminates at time t27.

The load graph indicates that in schedule 1, for example, the load on A is smallest among A, B, and C at time t21, and the load on B is smaller than the load on C at time t22, so a sequence of A, B, and C in this order was scheduled.

Total taken time T10 is a total taken time in schedule 1. Total taken time T10 is the total of rebuild time Ta, rebuild time Tb1, and rebuild time Tc1. Total taken time T10 is a time from rebuild start time t21 for A to rebuild termination time t27 for C.

As described above, the RAID apparatus 13 can precisely calculate a total taken time by totaling a volume-specific taken time for each to-be-rebuilt volume.

Next, schedule 2 will be described. Schedule 2 indicates a case in which a rebuild is executed first for A, secondly for C with a wait time of Tw inserted, and thirdly for B.

Rebuild time Ta, which is a rebuild time taken for A, indicates that a rebuild starts at time t21 and terminates at time t22.

Wait time Tw is an idle time from time t22 to time t23.

Rebuild time Tc2, which is a rebuild time taken for C, indicates that a rebuild starts at time t23 and terminates at time t24.

Rebuild time Tb2, which is a rebuild time taken for B, indicates that a rebuild starts at time t24 and terminates at time t26.

The load graph indicates that in schedule 2, for example, the load on A is smallest among A, B, and C at time t21, a wait until time t23 is inserted, and the load on C is smaller than the load on B at time t23, so a sequence of A, C, and B in this order was scheduled. The control unit may insert a wait in step S53 in rebuild time calculation processing. For example, the control unit may delay a rebuild start time for a subsequent to-be-rebuilt volume (that is, insert a wait) to avoid a time at which a high load is applied.

Total taken time T11 is a total taken time in schedule 2. Total taken time T11 is the total of rebuild time Ta, wait time Tw, rebuild time Tc2, and rebuild time Tb2. Total taken time T11 is a time from rebuild start time t21 for A to rebuild termination time t26 for B.

As described above, the RAID apparatus 13 can precisely calculate a total taken time by totaling a volume-specific taken time for each to-be-rebuilt volume. Even if a wait is inserted in schedule 2, there may be a case in which total taken time T11 can be made to be shorter than total taken time T10 in schedule 1.

The load pattern for B varies within a fixed width. Therefore, the rebuild time taken for B remains unchanged, regardless of the time during which the RAID apparatus 13 executes a rebuild for B. If the RAID apparatus 13 inserts a wait of Tw before a rebuild for C starts and executes a rebuild for C during a time while the load on C is low, the whole rebuild time can be shortened.

Thus, the RAID apparatus 13 can precisely calculate rebuild times.

Third Embodiment

Next, total taken time calculation processing in a third embodiment will be described with reference to FIG. 13. FIG. 13 illustrates a flowchart for total taken time calculation processing in the third embodiment. In the third embodiment, rebuild processing is scheduled sequentially from the logical volume that takes the shortest rebuild time. This can reduce the risk of the inability to restore data in a case in which during the rebuilding of a time-consuming logical volume, an error further occurs in another logical volume.

In total taken time calculation processing, a total taken time is calculated according to rebuild conditions, a rebuild start time, and the load analysis information 203.

Total taken time calculation processing is executed by the control unit (processor 15) included in the RAID apparatus 13 in step S28 in rebuild time prediction processing.

Step S61: The control unit sets a rebuild start time created in step S23 as a rebuild start time at which a first rebuild is executed.

Step S62: The control unit selects volumes eligible for rebuild time calculation (referred to below as volumes eligible for shortest time calculation) from the to-be-rebuilt volumes.

Step S63: The control unit calculates a rebuild time taken for each volume eligible for shortest time calculation and selects the shortest rebuild time from the calculated rebuild times. The method of calculating a rebuild time is the same as in step S54.

Step S64: The control unit updates the rebuild start time by taking the next rebuild start time as a time at which the shortest rebuild has been terminated. As a next rebuild start time, the control unit may set a time that is later than the time at which the immediately preceding rebuild was terminated and at which the load on a next volume eligible for shortest time calculation is low.

Step S65: The control unit excludes the volume for which the shortest rebuild time has been selected from the volumes eligible for shortest time calculation and updates the remaining volumes eligible for shortest time calculation.

Step S66: The control unit determines whether there is a remaining volume eligible for shortest time calculation. If there is a remaining volume eligible for shortest time calculation, the control unit returns to step S62. If there is no remaining volume eligible for shortest time calculation, the control unit proceeds to step S67.

Step S67: The control unit totals the shortest rebuild times to calculate a total taken time. The control unit may also obtain a time from the first rebuild start time to the last rebuild start time as the total taken time. After calculating the total taken time, the control unit terminates the total taken time calculation processing.

As described above, the RAID apparatus 13 can precisely calculate the total taken time by totaling a rebuild time taken for each logical volume 22.

The processing functions described above can be implemented by a computer. In this type of situation, programs in which processing executed by functions of the storage control apparatus 1 and RAID apparatus 13 is coded are provided. When the computer executes a program, processing functions are implemented on the computer. The programs, in which processing is coded, can be recorded on a computer-readable recording medium in advance. Computer-readable recording media include media in magnetic storage devices, optical disks, magneto-optical recording media, and semiconductor memories. Medium in magnetic storage devices include media in HDDs, flexible disks (FDs), and magnetic tapes. Optical disks include DVDs, DVD-RAMs, CD-ROMs, and CD-RWs. Magneto-optical recording media include magneto-optical disks (MOs).

To place programs on the market, a DVD, CD-ROM, or another type of transportable recording medium on which the programs have been recorded is sold. It is also possible to store the programs in a storage drive of a server computer and transfer the programs from the server computer through a network to another computer.

The programs recorded on the transportable recording medium or transferred from the server computer are supplied to a computer intended to execute the programs. The computer stores the supplied programs, in for example, its storage drive. The computer reads the programs from the storage drive and executes processing according to the programs. The computer can also read the programs directly from the transportable recording medium and can execute processing according to the programs. It is also possible that each time a program is transferred from the server computer connected through the network, the computer receives the program and executes processing according to the received program.

At least part of the above processing functions can also be implemented by a DSP, an ASIC, a PLD, or another electronic circuit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage control apparatus that controls a storage apparatus that includes a storage drive in which a plurality of logical volumes are set, the storage control apparatus comprising:
   a memory that stores load information of the plurality of logical volumes, respectively, the load information being created from a history of respective accesses to the plurality of logical volumes; and a processor coupled to the memory and configured to:
　　determine to-be-rebuilt volumes, which are targets to be rebuilt, from the plurality of logical volumes,
　　select, from the to-be-rebuilt volumes, logical volumes for which a volume-specific rebuild time is estimated, and
　　calculate a total of a plurality of rebuild times that are estimated for each of a plurality of rebuild sequences of the selected logical volumes, wherein totaling a respective rebuild time includes:
　　　　determining a volume-specific start time at which a rebuild will be started for a respective logical volume for a respective rebuild sequence which involves rebuilding the respective logical volume in one of multiple orders in the plurality of rebuild sequences,
　　　　estimating, by using the volume-specific start time and a load information corresponding to the respective logical volume from the stored load information of the plurality of logical volumes, a volume-specific rebuild time for rebuilding each of the selected logical volumes for the respective rebuild sequence, and
　　　　totaling the respective rebuild time for the respective rebuild sequence, based on the estimated volume-specific rebuild times.

2. The storage control apparatus according to claim 1, wherein the processor is further configured to:
　　determine a rebuild sequence in which the logical volumes included in the to-be-rebuilt volumes are rebuilt, according to load information corresponding to the to-be-rebuilt volumes, and
　　determine, according to the rebuild sequence, a sequence in which the logical volumes are selected.

3. The storage control apparatus according to claim 1, wherein the processor is further configured to:
　　determine a rebuild sequence in which the logical volumes included in the to-be-rebuilt volumes are rebuilt, according to an amount of data included in the storage drive in which the to-be-rebuilt volumes are set, and
　　determine, according to the rebuild sequence, a sequence in which the logical volumes are selected.

4. The storage control apparatus according to claim 2, wherein the processor is further configured to:
　　determine a current time as the volume-specific start time for a logical volume that was selected first, and
　　determine a volume-specific start time for a logical volume that was selected next by adding the volume-specific rebuild time for the logical volume that was selected first to the volume-specific start time for the logical volume that was selected first.

5. The storage control apparatus according to claim 2, wherein the processor is further configured to:
　　create a candidate start time at which the to-be-rebuilt volumes start to be built,
　　determine a volume-specific start time for a logical volume that was selected first according to the created candidate start time, and
　　determine a volume-specific start time for a logical volume that was selected next by adding the volume-specific rebuild time for the logical volume that was selected first to the volume-specific start time for the logical volume that was selected first.

6. The storage control apparatus according to claim 2, wherein the processor is further configured to:
　　create a candidate start time at which the to-be-rebuilt volumes start to be built,
　　determine a volume-specific start time for a logical volume that was selected first according to the created candidate start time, and
　　determine a volume-specific start time for a logical volume that was selected next by adding the volume-specific rebuild time for the logical volume that was selected first and a predetermined wait time to the volume-specific start time for the logical volume that was selected first.

7. The storage control apparatus according to claim 1, wherein the respective load information of the plurality of logical volumes includes information in which a predicted time at which an access to a respective logical volume will occur and information about an amount of load of the respective logical volume.

8. The storage control apparatus according to claim 1, further comprising:
　　selecting at least one rebuild time, from among the plurality of rebuild times calculated, for a notification.

9. The storage control apparatus according to claim 8, wherein the at least one rebuild time selected in the selecting is the shortest of the plurality of rebuild times.

10. A computer-readable non-transitory storage medium storing a storage control program for a storage control apparatus that controls a storage apparatus that includes a storage drive in which a plurality of logical volumes are set, the program is intended to cause a computer to execute processing for:
　　storing, in a memory, load information of the plurality of logical volumes, respectively, the load information being created from a history of respective accesses to the plurality of logical volumes,
　　determining to-be-rebuilt volumes, which are targets to be rebuilt, from the plurality of logical volumes,
　　selecting, from the to-be-rebuilt volumes, logical volumes for which a volume-specific rebuild time is estimated, and
　　calculating a total of a plurality of rebuild times that are estimated for each of a plurality of rebuild sequences of the selected logical volumes, wherein totaling a respective rebuild time includes:
　　　　determining a volume-specific start time at which a rebuild will be started for a respective logical volume for a respective rebuild sequence which involves rebuilding the respective logical volume in one of multiple orders in the plurality of rebuild sequences,
　　　　estimating, by using the volume-specific start time and the load information about the respective logical volume from the stored load information of the plurality of logical volumes, a volume-specific rebuild time for rebuilding each of the selected logical volumes for the respective rebuild sequence, and
　　　　totaling the respective rebuild time for the respective rebuild sequence, based on the estimated volume-specific rebuild times.

* * * * *